Sept. 27, 1960 M. A. F. J. MANIERE ET AL 2,954,436
RECEIVERS FOR FREQUENCY SHIFT-KEYED TELEGRAPH AND SIMILAR SIGNALS
Filed May 2, 1958 6 Sheets-Sheet 1

Sept. 27, 1960 M. A. F. J. MANIERE ET AL 2,954,436

RECEIVERS FOR FREQUENCY SHIFT-KEYED TELEGRAPH AND SIMILAR SIGNALS

Filed May 2, 1958 6 Sheets-Sheet 2

Sept. 27, 1960

M. A. F. J. MANIERE ET AL

RECEIVERS FOR FREQUENCY SHIFT-KEYED TELEGRAPH AND SIMILAR SIGNALS 2,954,436

Filed May 2, 1958

6 Sheets-Sheet 5

Sept. 27, 1960

M. A. F. J. MANIERE ET AL 2,954,436

RECEIVERS FOR FREQUENCY SHIFT-KEYED TELEGRAPH AND SIMILAR SIGNALS

Filed May 2, 1958

6 Sheets-Sheet 6

United States Patent Office 2,954,436

Patented Sept. 27, 1960

2,954,436

RECEIVERS FOR FREQUENCY SHIFT-KEYED TELEGRAPH AND SIMILAR SIGNALS

Maurice Auguste François Joseph Maniere, Conflans-Ste.-Honorine, and Armand Georges Malassenet, Saint-Ouen l'Aumone, France, assignors to Lignes Telegraphiques & Telephoniques, Paris, France Filed May 2, 1958, Ser. No. 732,559

Claims priority, application France May 14, 1957

5 Claims. (Cl. 178—88)

Figure 1:
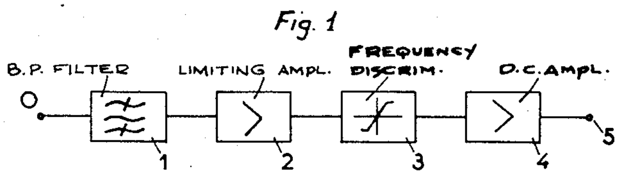

The present invention relates to signal receivers for alternating current communication systems using frequency shift coded signals and, more particularly, for frequency-keyed voice frequency telegraph systems. The invention may also, of course, be used in any transmission device using coded signals keyed according to the same method.

It is known that such receivers are little sensitive to noise coming from the transmission line to which they are connected when the level of the modulated carrier current is higher than the noise level. However, if for any reason whatsoever due either to bad performance of the remote transmitter or to a defective transmission line, the signal level becomes lower than the noise level, the receiver becomes very sensitive to any noise. Particularly, in telegraph systems, the current delivered by the receiver to the telegraph apparatus to which it is connected may then take any value, which is liable to cause false signals.

To obviate this drawback, such a receiver must include some guard circuit working in such a way that, when the input signal level becomes lower than a certain minimum permissible value, determined by the required transmission quality, the output circuit of said receiver remains locked in a predetermined condition.

According to the present invention, a receiver for frequency-keyed telegraph signals is provided, comprising an amplifier-limiter followed by a frequency discriminator itself followed by a direct current output amplifier, this latter feeding a utilization circuit, such as a telegraph repeater relay or an electromagnet of a telegraph apparatus, characterized in that it comprises a blocking circuit including an auxiliary amplifier, at the input of which the received signals are applied and the output of which feeds an amplitude detector delivering a rectified voltage substantially proportional to the amplitude of said received signals if they have a small amplitude, but having a constant value if the amplitude of said received signals exceeds a first predetermined value, and means for applying said rectified voltage to said utilization circuit to make it inoperative when the amplitude of said signals is lower than a second predetermined value, lower than the first one, and to render said circuit operative only when the latter amplitude exceeds said predetermined second value.

According to a preferred embodiment of the device of the invention, there is provided in said blocking circuit of said control amplifier a further direct-current amplifier the input of which is fed from said rectified voltage and the output of which is applied to said utilization circuit; said blocking circuit further including a feedback connection between said further D.C. and control amplifiers. The purpose of the latter arrangement is to give said blocking circuit non-reversible properties with respect to the sense of variation of the signal level, which is useful when said signal level is low and fluctuates in the vicinity of a critical threshold value. The improvement associated with the use of said feedback connection is due to the fact that, when the decreasing input signal voltage falls to a first pre-specified value, the gain of said control amplifier is made to suddenly fall from its normal value $g_1$ (corresponding to the normal operation of the receiver) to a much lower value $g_2$. On the contrary, when the increasing signal voltage reaches said pre-specified value, no change occurs in the gain of said control amplifier as long as the signal voltage remains lower than a second pre-specified value, for which said gain suddenly reverts to its former and normal value $g_1$.

The advantage of the just described arrangement is a twofold one: Firstly, when the input signal level progressively decreases from a value for which the receiver operates normally, the telegraph signal distortion appearing in the receiver remains practically constant and always lower than a prescribed value not exceeding a few percent, as long as the input signal voltage remains higher than the predetermined value hereafter designated as $u_s$. As soon as the input signal voltage falls to the value $u_s$, the utilization circuit is locked in one predetermined of its two possible working conditions without any trouble being caused by the intermediary level values for which the receiver could operate at random. Secondly, when the increasing input signal voltage reaches and thereafter just exceeds the value $u_s$, the utilization circuit can only be released and the operation of the receiver become normal again when this voltage will have further increased and reached another value $u_{s1}$ distinctly higher than $u_s$. Practically, the difference between the respective levels corresponding to $u_{s1}$ and $u_s$ is chosen of the order of magnitude of one neper (8.68 decibels). The advantage of such an arrangement is that, if the input signal voltage has reached through decreasing values but still slightly exceeds the value $u_s$, the utilization circuit remains locked in one predetermined of its two possible conditions, even if said voltage fluctuates in the vicinity of $u_s$. This avoids the risk of a sudden change in the condition of said utilization circuit under the influence of a slight increase in the noise level, and consequently of random operation of the apparatus.

Telegraph receivers for voice frequency signals with frequency keying according to the invention will now be described in greater detail by non-limitative examples of embodiments, with reference to the annexed drawings, in which:

Fig. 1 is a single-wire diagram of a conventional type of voice-frequency telegraph receiver for frequency-keyed signals.

Figure 2:
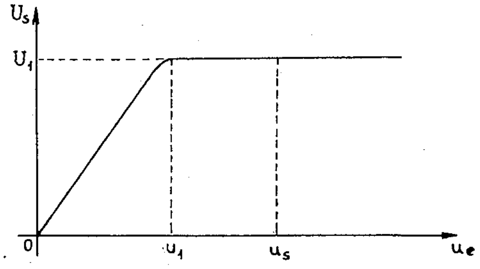

Fig. 2 graphically represents the magnitude of the output voltage as a function of that of the input voltage of the amplifier-limiter included in such a device.

Figure 3:
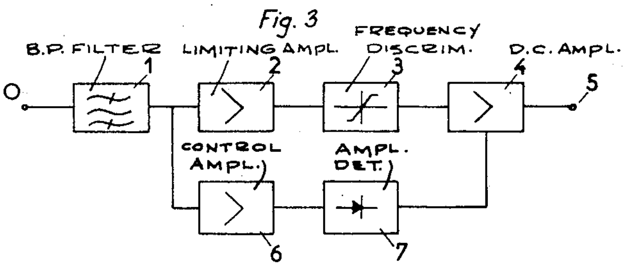
Figure 7:
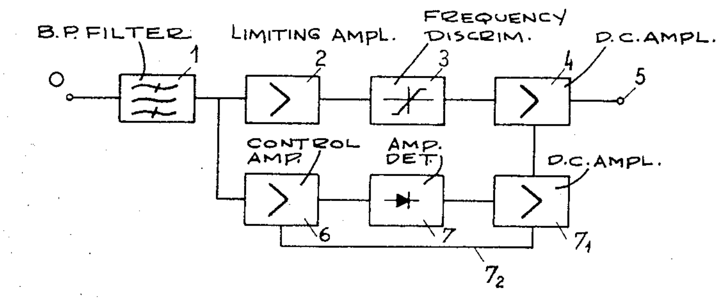

Figs. 3 and 7 are single-wire diagrams of telegraph receivers built according to the invention.

Figure 4:
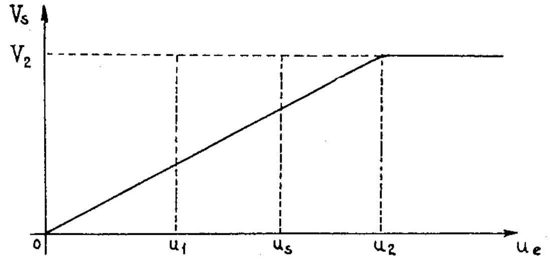
Figure 8:
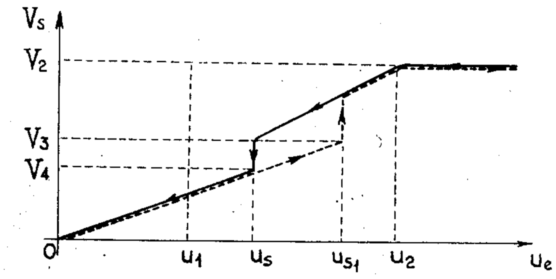

Figs. 4 and 8 graphically represent the magnitude of the output voltage as a function of the input voltage of the control amplifier included in the device of the invention, for various embodiments thereof.

Figs. 5, 6, 9 and 10 show, by way of examples, the diagrams of four types of voice frequency telegraph receivers for frequency-keyed signals built according to the invention.

The single-wire diagram of Fig. 1 shows a telegraph receiver of a conventional type. It contains a band-pass filter 1 for the separating of the required signals applied to its input 0 from other signals of a multi-channel telegraph transmission system. Filter 1 is followed by an amplifier-limiter 2, the output voltage $U_s$ of which is proportional to the input voltage $u_e$ of the received signal as long as this input voltage remains lower than a constant value $u_1$. The curve representing the output voltage $U_s$ as a function of the input voltage $u_e$ is shown on Fig. 2. A frequency discriminator 3 is fed from the output of the amplifier-limiter; its output voltage, which depends on the frequency of the received signals, is applied to the input of an output amplifier 4. The signal issuing from the receiver at terminals 5 depends therefore on the incident signal frequency and not on its level as long as the voltage received at the input remains higher than $u_1$.

In the special case of a voice frequency telegraph device, the frequency of the received signals may take two values $F_1$ and $F_2$ only, and the amplitudes corresponding to these two frequencies are very near to each other; the output current is then equal to +I or −I (double current signalling) or +I or 0 (single current signalling), according to whether the frequency of the received signals is $F_1$ or $F_2$.

The receiver according to the invention, very schematically represented on Fig. 3, includes in addition to elements 1, 2, 3, 4 identical with those of Fig. 1, a blocking device constituted by elements 6 and 7, which is the object of the invention.

In Fig. 3, 6 is an amplifier-limiter characterized in that its output voltage $V_s$ is proportional to the voltage of the input signal $u_e$ if the latter voltage value is lower than a given value $u_2$, but remains constant and equal to $V_2$ when the input voltage is higher than $u_2$. Fig. 4 represents the curve of the output voltage $V_s$ as a function of the input signal voltage.

The value $u_2$ is chosen higher than the value $u_s$ corresponding to the minimum signal level compatible with the required transmission quality. On the contrary, the value $u_1$ must be lower than $u_s$.

The alternating voltage of the amplified signal at the output of amplifier 6, detected by an amplitude detector 7, is applied to the output device 4 of the receiver in such a manner that the latter be locked by this detected voltage and prevents transmitting of signals to 5 as long as the input voltage is lower than $u_s$, whatever the value of the voltage delivered by discriminator 3 may be. On the contrary, when the detected voltage value exceeds that corresponding to $u_s$, the device 4 becomes operative. The time constant of detector 7 must be relatively high with respect to the duration of the elementary signals of frequencies $F_1$ and $F_2$, so that the rectified voltage received at the output of 7 remains substantially constant during the transmission of said signals.

Figure 5:
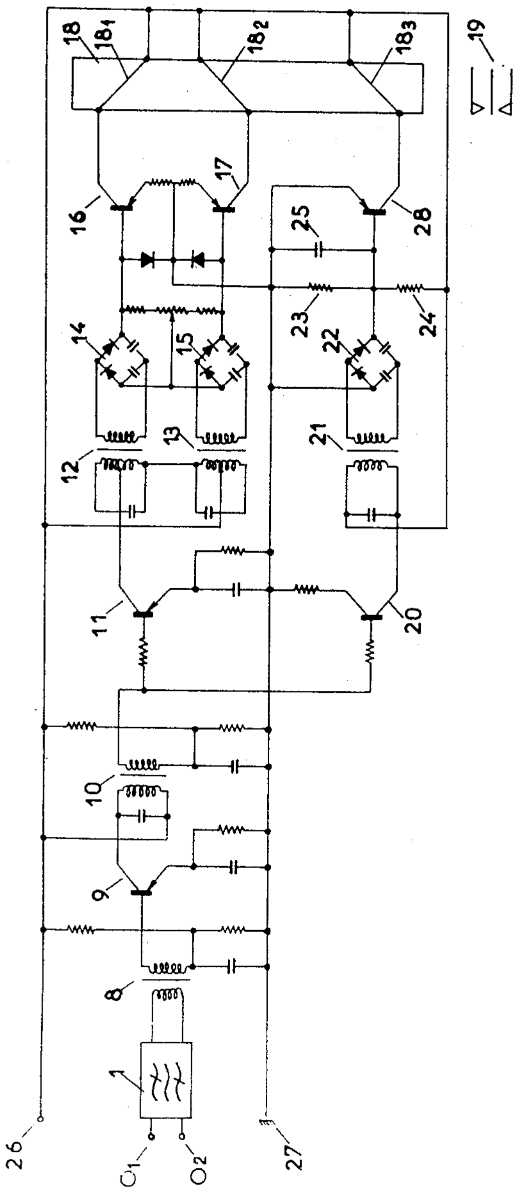

Fig. 5 represents a practical embodiment of a receiver according to the invention.

The band-pass filter 1 at the input of which the received signals are applied between terminals $O_1$ and $O_2$ is connected through a transformer 8 to the input of an amplifier-limiter constituted by a double set of transistors 9 and 11 themselves interconnected by transformer 10.

Transistor 11 feeds a frequency discriminator of a well known type constituted by two tuned transformers 12 and 13 respectively connected to the voltage-doubling rectifier assemblies 14 and 15. The rectified voltage developed at the output terminals of this discriminator is symmetrically applied to the amplifier constituted by two transistors 16 and 17, the collector currents of which respectively feed two windings of a polarized relay 18. Depending on whether the input signal frequency is equal to $F_1$ or $F_2$, one or the other of the respective collector currents of the two transistors 16 and 17 is zero, while the collector current of the other energizes winding $18_1$ or $18_2$ of relay 18, thus causing this relay to operate and close contacts 19.

Under these conditions, if the signal received from the remote transmitter temporarily disappears or if its level becomes very low, the receiver becomes sensitive to noise coming from the line and the voltage at the discriminator output changes according to the level of the noise, which changes the currents delivered by transistors 16 and 17. However, the auxiliary elements provided according to the invention then causes relay 18 to assume a predetermined position when the input signal level becomes lower than the value corresponding to $u_s$, whatever the intensity of the currents delivered by transistors 16 and 17 may be. For this purpose the voltage obtained at the output of the first amplifying stage constituted by transformers 8 and 10 and transistor 9 is applied to an auxiliary amplifying stage constituted by a transistor 20 and a transformer 21 and having a gain lower than that of the stage corresponding to transistor 11. The output voltage of this amplifying system is then detected by a voltage-doubling rectifier assembly 22, having a high time constant defined by resistances 23, 24 and condenser 25. The voltage divider constituted by resistances 23 and 24 and connected between the two terminals 26 and 27 of the D.C. source feeding the transistors, biasses the base electrode of transistor 28 in such a manner that as long as the input signal level is lower than the level corresponding to $u_s$, the voltage delivered by 22, which is of the opposite polarity to the biassing voltage fixed by the potentiometer but is of lesser magnitude, is not capable of preventing the passing of the collector current of transistor 28 which flows through a third winding $18_3$ of relay 18. The windings of the relay are so dimensioned that the magnetic field caused by the collector current of transistor 28 always exceeds that caused by the collector currents of transistors 16 and 17, which work in opposite directions, by an amount substantially equal to the value of the field corresponding to the operating threshold of the relay.

Now if, on the contrary, the input signal level exceeds that corresponding to $u_s$, the voltage delivered by detector 22 becomes higher than the biassing voltage delivered by the voltage divider (23, 24). It results therefrom that the collector current of transistor 28 becomes zero; the current in the relay winding $18_3$ is then suppressed and the receiver operates normally.

Figure 6:
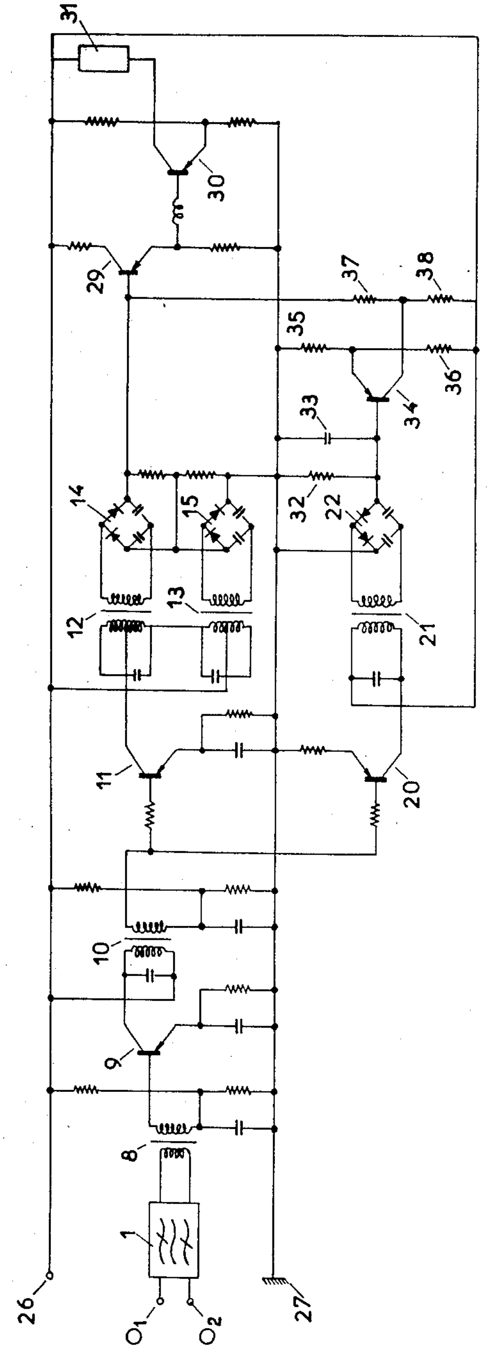

Fig. 6 shows another embodiment of the invention, in the case of a voice frequency telegraph receiver, directly feeding a telegraph apparatus according to the so-called "single current" method, for instance a teleprinter.

In Fig. 6 all elements identical with those of Fig. 5 have been designated by the same reference numbers. It may be seen that the voltage developed across the discriminator terminals is applied to the base electrode of transistor 30, the collector current of which feeds the electromagnet 31 of a telegraph apparatus. Assuming, for instance, the frequency of the received signal to be equal to $F_1$, the discriminator output voltage is such that transistor 29 is released, thus allowing transistor 30 to deliver the necessary current to operate the electromagnet 31. If the signal frequency is equal to $F_2$, transistor 29 is blocked, and itself blocks transistor 30, which allows electromagnet 31 to return to its rest condition.

If the signal received from the remote transmitter disappears or if its level becomes very low, the voltage developed at the terminals of the discriminator varies according to the noise level of the line, thus erratically changing the current delivered by transistor 30. In order to obviate this drawback, a voltage is taken at the output of the first amplifying stage, as in the case of Fig. 5, and then amplified by transistor 20 and detected by the voltage doubling rectifier assembly 22. The time constant of the assembly 22 is selected with a high value with respect to the duration of an elementary telegraph signal by a suitable choice of resistance 32 and condenser 33. The detected voltage is applied to the base electrode of transistor 34, the emitter of which is biassed by the voltage divider constituted by the two resistances 35, 36 connected between terminals 26 and 27 of the D.C. supply source.

The voltage obtained at the collector of transistor 34 is applied by means of resistances 37 and 38 to the base electrode of transistor 29, with such a polarity as to suppress the collector current of 29, in addition to the output voltage of the discriminator.

If the input signal voltage is lower than $u_s$, the detected voltage applied to the base electrode of transistor 34 is insufficient for releasing this transistor, the collector current of which remains substantially zero. Consequently, the voltage across resistance 37 remains practically zero and the base electrode of transistor 29 remains at a potential near to that of terminal 26 of the D.C. supply source, which releases transistor 29, whatever the voltage issued from the discriminator may be. Under these conditions, transistor 30 is also released and its collector current operates the electromagnet 31, which is thus definitely set at its rest position.

If, on the contrary, the input signal voltage exceeds $u_s$, the rectified voltage applied to the base electrode of transistor 34 becomes high enough to release its collector current and the collector of 34 transmits to the base electrode of transistor 29 a biassing voltage which changes the operating point of 29 and reduces the bias potential of its base electrode to a value much lower than the D.C. voltage available at the output terminals of the discriminator. Under these conditions, the working circuit operates normally.

Other improved and preferred embodiments of the invention, incorporating the above-mentioned feedback connection in the blocking circuit, will now be described. The nature of the obtained improvement will be explained with the aid of the single-wire diagram of Fig. 7, in which the reference numbers 0 to 7 have the same meanings as in Fig. 3.

The difference between the diagrams of Fig. 7 and Fig. 3 consists on one hand in the adding to the device of the latter figure of a D.C. amplifier $7_1$, the input of which is fed from the voltage delivered by detector 7, and the output voltage of which is applied to the telegraph relay or low frequency telegraph signal amplifier 4; and on the other hand, in that there is provided between the D.C. amplifier $7_1$ and the control amplifier 6 a feedback connection $7_2$, for the purpose of altering the relationship between the input and output voltages of said control amplifier in such a way that the ratio of latter said voltages depend not only on their instantaneous magnitudes but also on the fact that these magnitudes are reached through increasing or decreasing values. The usefulness of the feedback connection $7_2$ resides in that, thanks to it, it is possible to suddenly decrease the gain of 6 from a value $g_1$ to a much lower value $g_2$ when the decreasing signal level reaches a predetermined value $u_s$, while with an increasing signal voltage, the gain of 6 undergoes a reverse change only when said voltage reaches a value $u_{s_1}$ higher than $u_s$.

Fig. 8 graphically shows the mode of operation of amplifier 6 in the latter case, in the form of an output voltage $V_s$, input voltage $u_e$ characteristic curve. As it may be seen on Fig. 8, this curve is such that the output voltage $V_s$ of amplifier 6 remains constant and equal to $V_2$ when its input voltage $u_e$ is higher than a given value $u_2$ and in that, for decreasing values of $u_e$, said output voltage remains proportional to $u_e$ above a value $u_s$ for which it suddenly changes to become again proportional to $u_e$ but with a different ratio thereto. For increasing values of $u_e$, the discontinuity in the output voltage curve appears when $u_e$ equals $u_{s_1}$, $u_{s_1}$ approximately being one neper (8.68 decibels) higher than $u_s$.

The value of $u_2$ must be chosen on one hand higher than the value $u_s$ corresponding to the minimum signal level compatible with the required communication quality and, on the other hand, higher than $u_{s_1}$ which itself is chosen lower than the normal input level. On the contrary, $u_1$ must be lower than $u_s$.

In the device of Fig. 7, the alternating voltage of the amplified signal at the output of the amplifier-limiter 6 is rectified by member 7 which is essentially an amplitude detector, and thereafter the rectified voltage from 7 is applied by means of a D.C. amplifier $7_1$, to the output stage of the receiver in such a manner that the latter be locked by the so rectified voltage and does not transmit any signals to 5 if the input voltage becomes lower than $u_s$, whatever the value of the output voltage delivered by discriminator 3 may be.

The D.C. amplifier $7_1$ is connected by means of a connection $7_2$ to the amplifier 6, in order to obtain the following result: if the input level of 6 reaches $u_s$ through decreasing values, $7_1$ locks 4 and causes the gain of 6 to pass from an initial value $g_1$ to a lower value $g_2$. The amplifier output voltage therefore suddenly passes from $V_3$ to $V_4$, and so ensures the locking of 4, even if the value of $u_e$ somewhat varies around $u_s$.

On the contrary, for increasing values of $u_e$, $V_s$ reaches value $V_3$ only for a value of the input voltage of 6 equal to $u_{s_1}$ and ensures the unlocking of 4.

Figure 9:
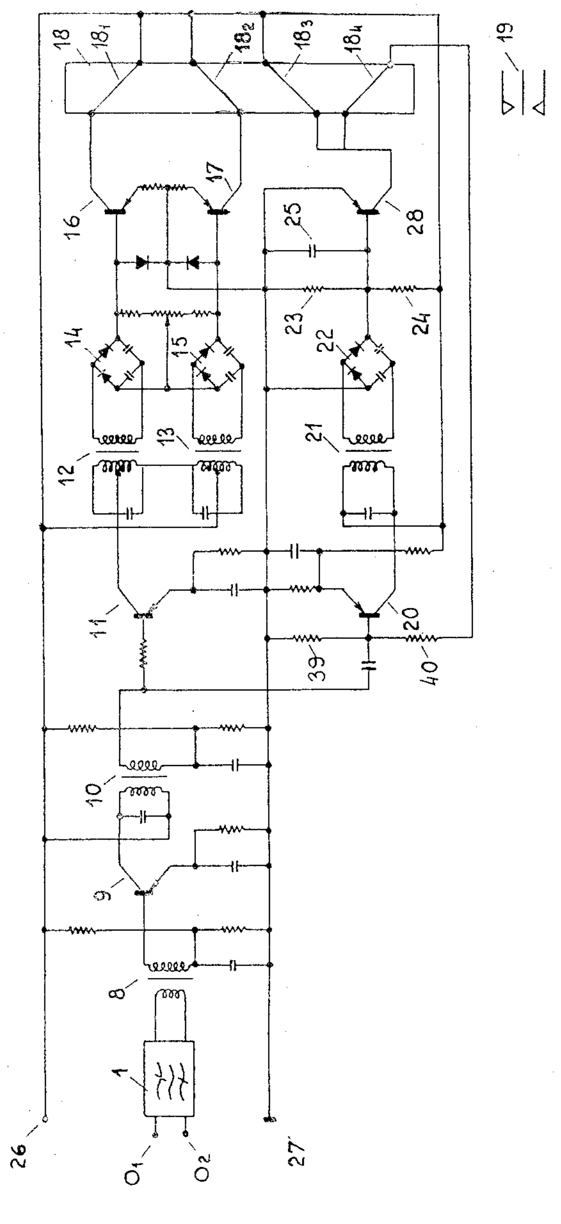
Figure 10:
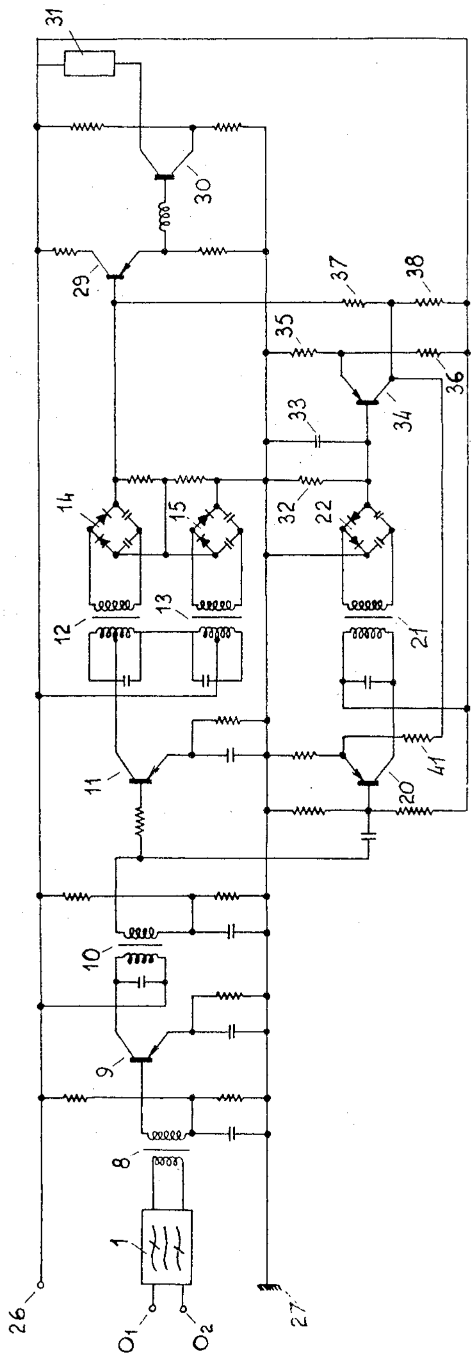

Two practical embodiments of the invention are shown on Figs. 9 and 10, in which the elements with the same reference numbers play the same respective parts as in Figs. 5 and 6. On Fig. 9, the collector of transistor 28 is connected to the base electrode of transistor 20 by the feedback connection consisting of a fourth winding $\mathbf{18_4}$ of relay 18 in series with resistor 40. If the collector current of transistor 28 is not zero, the voltage between its collector and emitter electrodes tends toward a zero value and, through resistor 40, accordingly changes the operating point of transistor 20, the gain of which then decreases from $g_1$ to $g_2$. Therefore, even if the input signal voltage slightly increases, the output voltage of the amplifying stage constituted by transistor 20 and transformer 21 becomes lower than it was before, when the gain of transistor 20 was equal to $g_1$. The voltage from the voltage-doubling rectifier assembly 22 also becomes distinctly lower than the former value it had with the gain of transistor 20 equal to $g_1$, and therefore lower than the permanent bias voltage defined by resistors 23 and 24. Transistor 28 remains therefore blocked for small variations of the input signal level.

If, on the contrary, the increasing input signal voltage becomes higher than $u_{s_1}$ (Fig. 8), the voltage delivered by detector 22 (Fig. 9), becomes higher than the bias voltage delivered by the voltage divider (23, 24), and reduces the collector current of transistor 28 to zero. The current in winding $\mathbf{18_3}$ vanishes and the receiver operates normally again.

Simultaneously, the collector voltage of transistor 28 increases, causing the gain of transistor 20 also to increase and to revert to its normal value $g_1$, which ensures the blocking of transistor 28.

However, owing to the fact that resistors 39 and 40 and windings $\mathbf{18_3}$ and $\mathbf{18_4}$ are series-connected between terminals 26 and 27 of the D.C. source, a permanent current persists in these windings, but has no influence on the operation of the relay, as these two windings are wound in opposite directions.

In the case of Fig. 10, which is a modification of Fig. 6, a feedback connection between transistors 34 and 20 is constituted by resistor 41. Through resistor 41, a biasing voltage is transmitted to the emitter of transistor 20, in order to reduce its again, which consequently reduces the rectified voltage applied to transistor 34 so as to keep transistor 30 in its normal released condition, corresponding to the rest condition of electromagnet 31. The gain of transistor 20 then retains its lower value, even if the signal voltage slightly increases.

Now, if on the contrary, the input signal voltage becomes higher than $u_{s_1}$ (Fig. 8), the voltage applied to the base electrode of transistor 34 (Fig. 10) is sufficient to release it and its collector transmits to the base electrode of transistor 29 a biassing voltage which changes the operating point of 29 and reduces the bias potential of its base electrode to a value much lower than the D.C. voltage developed at the output terminals of discriminator 3 (Fig. 7). Moreover, resistor 41 transmits to the emitter of transistor 20 a biassing voltage with such a polarity as to increase its gain and consequently the rectified voltage applied to transistor 34, which remains in its released condition even if the signal voltage slightly decreases. Under these conditions, the receiver operates normally.

What is claimed is:

1. A receiver for frequency-shift keyed signals, comprising a limiter-amplifier, a frequency discriminator coupled to and fed by said limiter-amplifier, means for supplying said signals to the limiter-amplifier, a direct-current amplifier coupled to and fed by said discriminator, an electromagnet circuit coupled to and fed by said direct-current amplifier, a blocking circuit comprising a control amplifier to which said signals are applied, the control amplifier comprising a transistor stage including a base electrode, a rectifying detector coupled to and fed by said control amplifier, said detector having a non-linear amplitude characteristic and delivering a rectified voltage proportional to the amplitude of the signals applied thereto for low-level signals and a constant voltage when the latter said signals exceed a first predetermined level, and means for applying said rectified voltage to said electromagnet circuit to prevent its operation when the level of latter said signals is lower than a second predetermined level lower than said first level and to render said electromagnet circuit operative when the level of latter said signals exceeds said second predetermined level, said means for applying said rectified voltage to said electromagnet circuit including a transistor amplifier stage including a base electrode which is submitted to said rectified voltage and a collector circuit, and a direct-current feedback connection between the collector circuit and the base electrode of the transistor stage of said control amplifier.

2. A receiver for frequency-shift keyed signals, comprising a limiter-amplifier, a frequency discriminator coupled to and fed by said limiter-amplifier, means for supplying said signals to the limiter-amplifier, a direct-current amplifier coupled to and fed by said discriminator, an electromagnet circuit coupled to and fed by said direct-current amplifier, a blocking circuit comprising a control amplifier to which said signals are applied, the control amplifier comprising a transistor stage including a base electrode, a rectifying detector coupled to and fed by said control amplifier, said detector having a non-linear amplitude characteristic and delivering a rectified voltage proportional to the amplitude of the signals applied thereto for low-level signals and a constant voltage when the latter said signals exceed a first predetermined level, and means for applying said rectified voltage to said electromagnet circuit to prevent its operation when the level of latter said signals is lower than a second predetermined level lower than said first level and to render said electromagnet circuit operative when the level of latter said signals exceeds said second predetermined level, said electromagnet circuit comprising a transistor amplifier stage and an electromechanical relay including at least three windings, said direct-current amplifier including an output stage comprising a pair of transistors including base electrodes and collector circuits, said base electrodes being coupled to said discriminators, two of said windings being coupled to and energized by the collector circuits of said pair of transistors constituting the output stage of said direct-current amplifier, the other of said windings being coupled to and energized by said further transistor stage.

3. A receiver as claimed in claim 2, wherein said electromechanical relay includes a fourth winding submitted to part of the collector current of said further transistor stage and series-connected with a resistor, the direct-current voltage developed across which is applied to the base electrode of said transistor amplifier stage of said control amplifier.

4. A receiver for frequency-shift keyed signals, comprising a limiter-amplifier, a frequency discriminator coupled to and fed by said limiter-amplifier, means for supplying said signals to the limiter-amplifier, a direct-current amplifier coupled to and fed by said discriminator, an electromagnet circuit coupled to and fed by said direct-current amplifier, a blocking circuit comprising a control amplifier to which said signals are applied, the control amplifier comprising a transistor stage including a base electrode, a rectifying detector coupled to and fed by said control amplifier, said detector having a non-linear amplitude characteristic and delivering a rectified voltage proportional to the amplitude of the signals applied thereto for low-level signals and a constant voltage when the latter said signals exceed a first predetermined level, and means for applying said rectified voltage to said electromagnet circuit to prevent its operation when the level of latter said signals is lower than a second predetermined level lower than said first level and to render said electromagnet circuit operative when the level of latter said signals exceeds said second predetermined level, said means for applying said rectified voltage to said electromagnet circuit including a further transistor amplifier stage including a base electrode submitted to rectified voltage from said detector, said direct-current amplifier including a transistor amplifier stage including a collector circuit and a base electrode, said electromagnet circuit comprising a winding coupled to and energized by the collector circuit of the transistor amplifier stage included in said direct-current amplifier, and a resistor coupled to said further transistor stage, at least part of the collector current of said further transistor stage flows through said resistor, the direct-current voltage developed across which is applied to the base electrode of said direct-current transistor amplifier stage.

5. A receiver as claimed in claim 4, wherein part of the collector current of said further transistor stage flows through a further resistor, and wherein the direct-current voltage developed across said further resistor is applied to the emitter of said transistor stage of said control amplifier.

References Cited in the file of this patent

UNITED STATES PATENTS

| | | |
|---|---|---|
| 2,616,969 | Maki | Nov. 4, 1952 |
| 2,629,775 | Goldstine | Feb. 24, 1953 |
| 2,654,025 | Higgins | Sept. 29, 1953 |
| 2,654,801 | Atwood | Oct. 6, 1953 |